United States Patent [19]

Kira et al.

[11] Patent Number: 5,278,952
[45] Date of Patent: Jan. 11, 1994

[54] DOCUMENT PROCESSING APPARATUS HAVING LAYOUT DISPLAY CONTROL SYSTEM

[75] Inventors: Haruki Kira; Yuri Usami, both of Nagoya, Japan

[73] Assignee: Brother Kogyo Kabushiki Kaisha, Nagoya, Japan

[21] Appl. No.: 648,820

[22] Filed: Feb. 1, 1991

[30] Foreign Application Priority Data

Feb. 2, 1990 [JP] Japan .................................. 2-24906

[51] Int. Cl.⁵ ............................................ G06F 15/62
[52] U.S. Cl. .................................... 395/145; 395/151; 359/36
[58] Field of Search ................ 395/145, 148; 358/450, 358/451, 452

[56] References Cited

U.S. PATENT DOCUMENTS 4,451,900  5/1984  Mayer et al. ......................... 364/900
4,951,233  8/1990  Fujiwara et al. ..................... 364/523

OTHER PUBLICATIONS

T. W. Ringle and M. S. Van Dyke, Multi-Page Document Display, IBM Technical Disclosure Bulletin, vol. 23, No. 8, Jan. 1981.

QUE Corporation; "Using WordPerfect 5.1; Special Edition," pp. ii, 155, 229, 230, 233-236 563 and 564; 1989.

Apple Computer, "HyperCard User's Guide," 1988.

Primary Examiner—Heather R. Herndon
Assistant Examiner—Joseph H. Field
Attorney, Agent, or Firm—Oliff & Berridge

[57] ABSTRACT

A document processing apparatus has a layout display control system including a current page identification display controller a current page changing device, and a document data display controller. A current page number indicating a current page can be changed into a new current page number in the layout display mode, and an identification which distinguishes the layout display area corresponding to the new current page number can be displayed. The displayed identification allows the operator to recognize the current page number with accuracy.

5 Claims, 8 Drawing Sheets

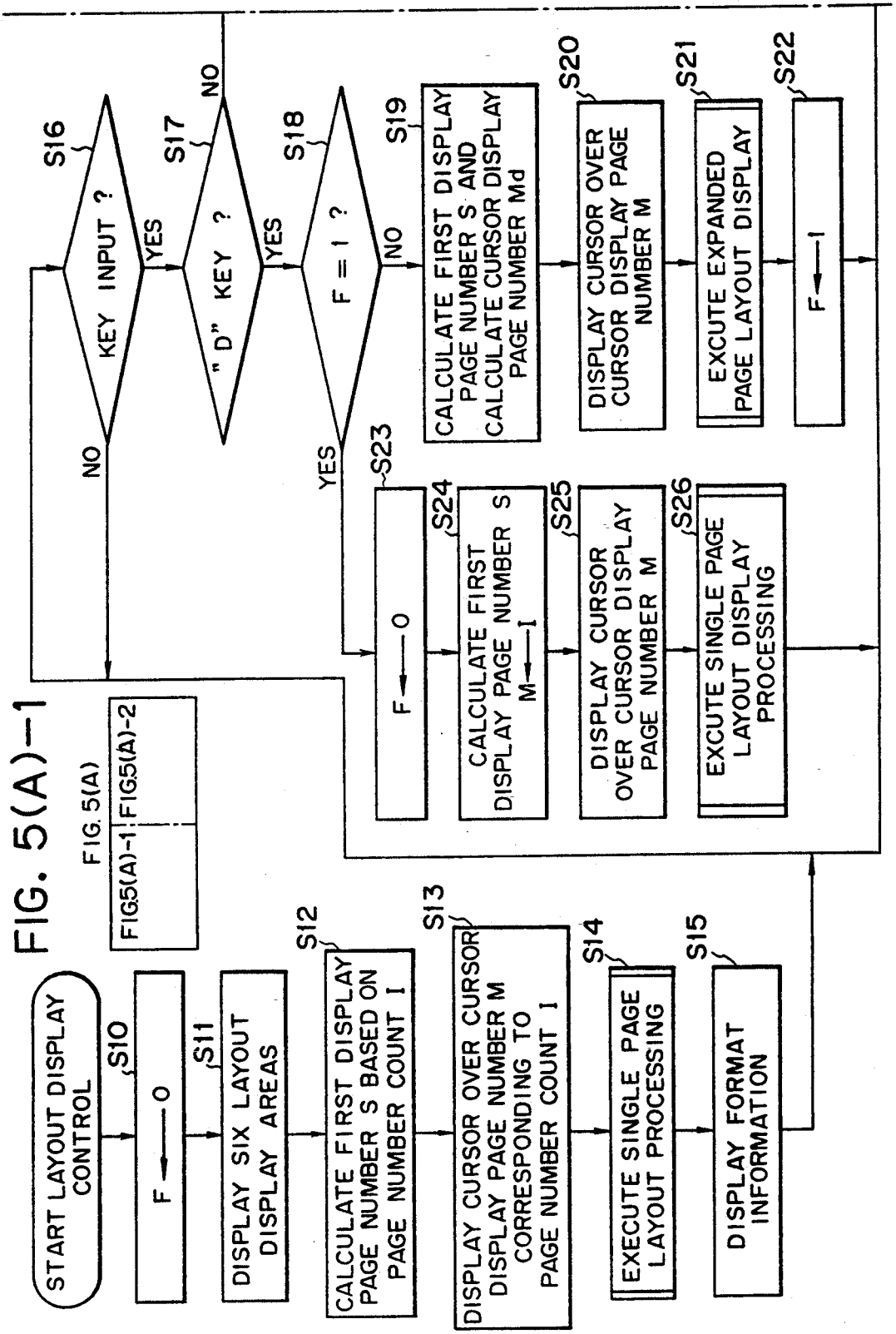

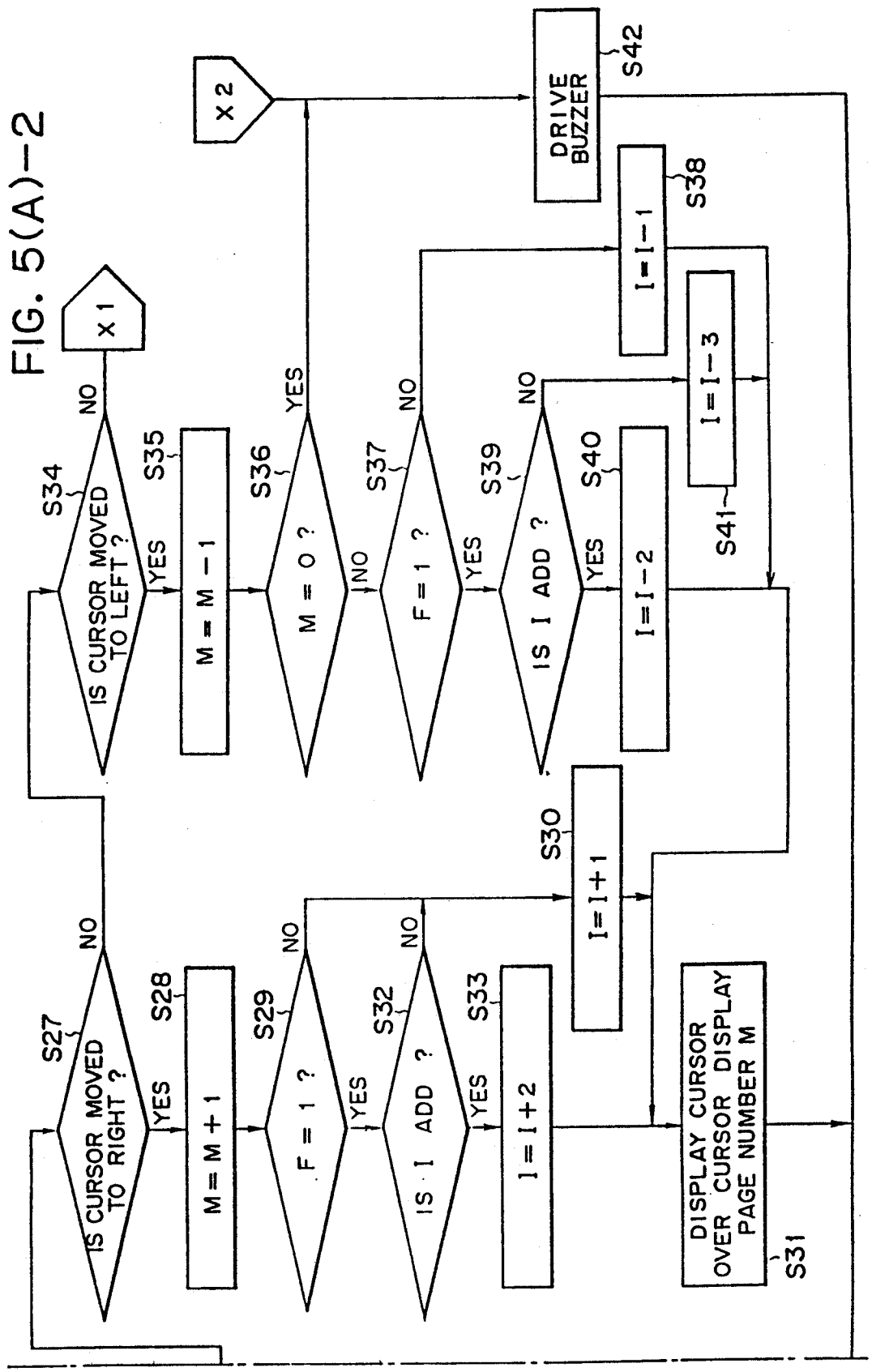

DOCUMENT PROCESSING APPARATUS HAVING LAYOUT DISPLAY CONTROL SYSTEM

BACKGROUND OF THE INVENTION

The present invention relates to a document processing apparatus having a layout display control system therefor, and more particularly to a document processing apparatus having a layout display control system which, while the layouts of a plurality of pages of document data are being displayed in a plurality of respective layout display areas, can change a current page number and display an identification which distinguishes the layout display area corresponding to the current page number.

English word processors, for example, generally have a display for displaying a plurality of lines and also incorporate many functions to facilitate inputting and editing document data. Particularly, some word processors which have become available recently have a document layout display function for converting the arrangement of characters of document data into the arrangement of dots or line segments, and displaying the layout of each page of document data.

In a process for displaying the layout of document data, desired document data are displayed on a display, and a "layout" key is pressed to select a layout display mode and erase the displayed document data. Thereafter, a rectangular layout display area indicative of a printing area is displayed on the basis of format information relative to a printing format that has been inputted in advance, and then the layout of the current page of document data which was displayed on the display is disposed in the layout display area. At this time, the layout of a next page of document data or the layout of a previous page of document data is individually displayed when a "next page" key or a "previous page" key is pressed. For displaying the layouts of a plurality of document data, it has heretofore been necessary to display the layout of a first page of document data and thereafter press the "next page" key a plurality of times. Therefore, it has been inefficient to display the layouts of a number of document data.

The same inventors as this application have proposed a layout display control system for displaying a plurality of layout display areas on a display and displaying the layouts of a plurality of pages of document data including a current page in the respective layout display areas in a group.

The above proposed layout display control system has been frequently used in a word processor. In the word processor, however, the current page number cannot be changed while a layout is being displayed. To modify the layout of a page of document data other than the current page, the layout display mode is once canceled, and then the current page of document data which is indicated by the current page number is displayed on the display. Thereafter, a "next page" key or a "previous page" key is pushed to display a desired page of document data whose layout is to be modified. Such a process is however complex to be carried out.

SUMMARY OF THE INVENTION

It is an object of the present invention to provide a layout display control system for a document processing apparatus, which can change the current page number of a current page into a new current page number while the layouts of a plurality of pages of document data are being displayed, and can display the current page of document data which is indicated by the new current page number, when the display of the layouts is canceled.

In order to attain the above object, a document processing apparatus according to this invention comprises input means for inputting document data and various command signals, document data memory means for storing inputted document data of a plurality of documents, display means for selectively displaying document data and a plurality of layout display areas, current page memory means for storing a current page number indicating a current page of document data displayed, together with a cursor, on the display means, layout display mode selecting means for selecting a layout display mode to display the layouts of document data, layout display control means for reading a plurality of pages of document data, including the current page of document data which is indicated by the current page number stored in said current page memory means from the document data memory means converting the read pages of document data into layout data and displaying the layouts of the pages of document data in the respective layout display areas in a layout display mode, current page identification display control means for displaying an identification which distinguishes the layout display area corresponding to the current page number stored in the current page memory means from the other layout display areas in the layout display mode, current page changing means for changing the current page number stored in said current page memory means into a new current page number in the layout display mode, and document data display control means for displaying, on the display means, the page of document data which is indicated by the new current page number stored in said current page memory means, together with the cursor, when the display of the layouts effected by the layout display control means is canceled.

In the layout display control system for a document processing apparatus according to the present invention, the current page memory means stores a current page number indicating a current page of document data to be displayed on the display together with a cursor. The layout display control means reads a plurality of pages of document data, including the current page of document data which is indicated by the current page number stored in the current page memory means, from the document data memory means, converts the read pages of document data into layout data, and displays the layouts of the pages of document data in the respective layout display areas, in the layout display mode which is selected by the layout display mode selecting means. At this time, the current page identification display control means displays an identification which distinguishes the layout display area corresponding to the current page number from the other layout display areas. When the current page number stored in the current page memory means is changed into a new current page number by the current page changing means, the current page identification display control means displays an identification which distinguishes the layout display area corresponding to the new current page number.

When the display of the layouts effected by the layout display control means is canceled, the document data display control means displays, on the display, the page of document data which is indicated by the new current page number stored in the current page memory means, together with the cursor.

BRIEF DESCRIPTION OF THE DRAWINGS

FIGS. 5(A) and 5(B) are flowcharts for a layout display control routine;

DETAILED DESCRIPTION OF THE INVENTION

A preferred embodiment according to this invention will be described hereunder with reference to the accompanying drawings.

Figure 1:
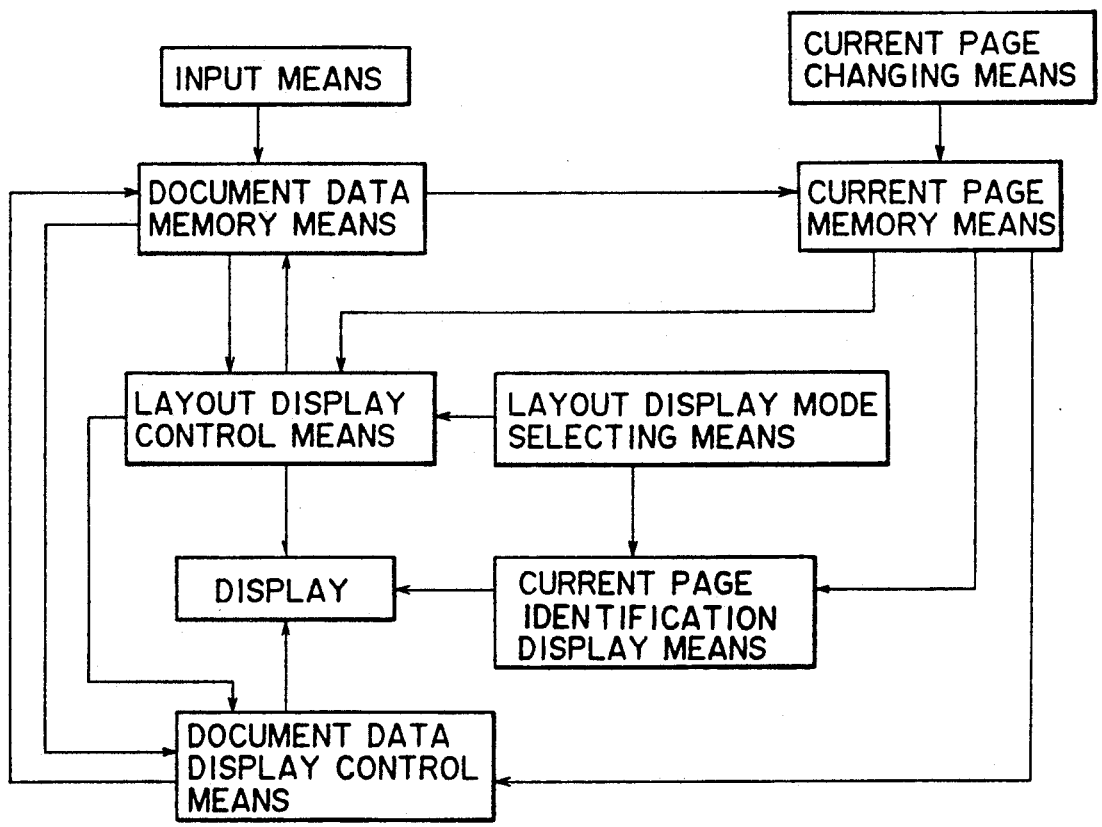
FIG. 1 is a functional block diagram of a layout display control system according to the present invention.

FIG. 1 is a block diagram for showing one embodiment of the document processing apparatus including the layout display control system. The document processing apparatus according to this embodiment includes input means for inputting document data and various command signals therethrough, document data memory means for storing the inputted document data of a plurality of documents, a display for selectively displaying the document data and a plurality of layout display areas, current page memory means for storing a current page number indicating a current page of document data displayed, together with a cursor, on the display, layout display mode selecting means for selecting a layout display mode to display the layouts of document data, layout display control means for reading a plurality of pages of document data, including the current page of document data which is indicated by the current page number stored in the current page memory means, from the document data memory means, converting the read pages of document data into layout data, and displaying the layouts of the pages of document data in the respective layout display areas, in a layout display mode, and the layout display control system comprising current page identification display control means for displaying an identification which distinguishes the layout display area corresponding to the current page number stored in the current page memory means from the other layout display areas in the layout display mode, current page changing means for changing the current page number stored in the current page memory means into a new current page number in the layout display mode, and document data display control means for displaying, on the display, the page of document data which is indicated by the new current page number stored in the current page memory means, together with the cursor, when the display of the layouts effected by the layout display control means is canceled.

Figure 2:
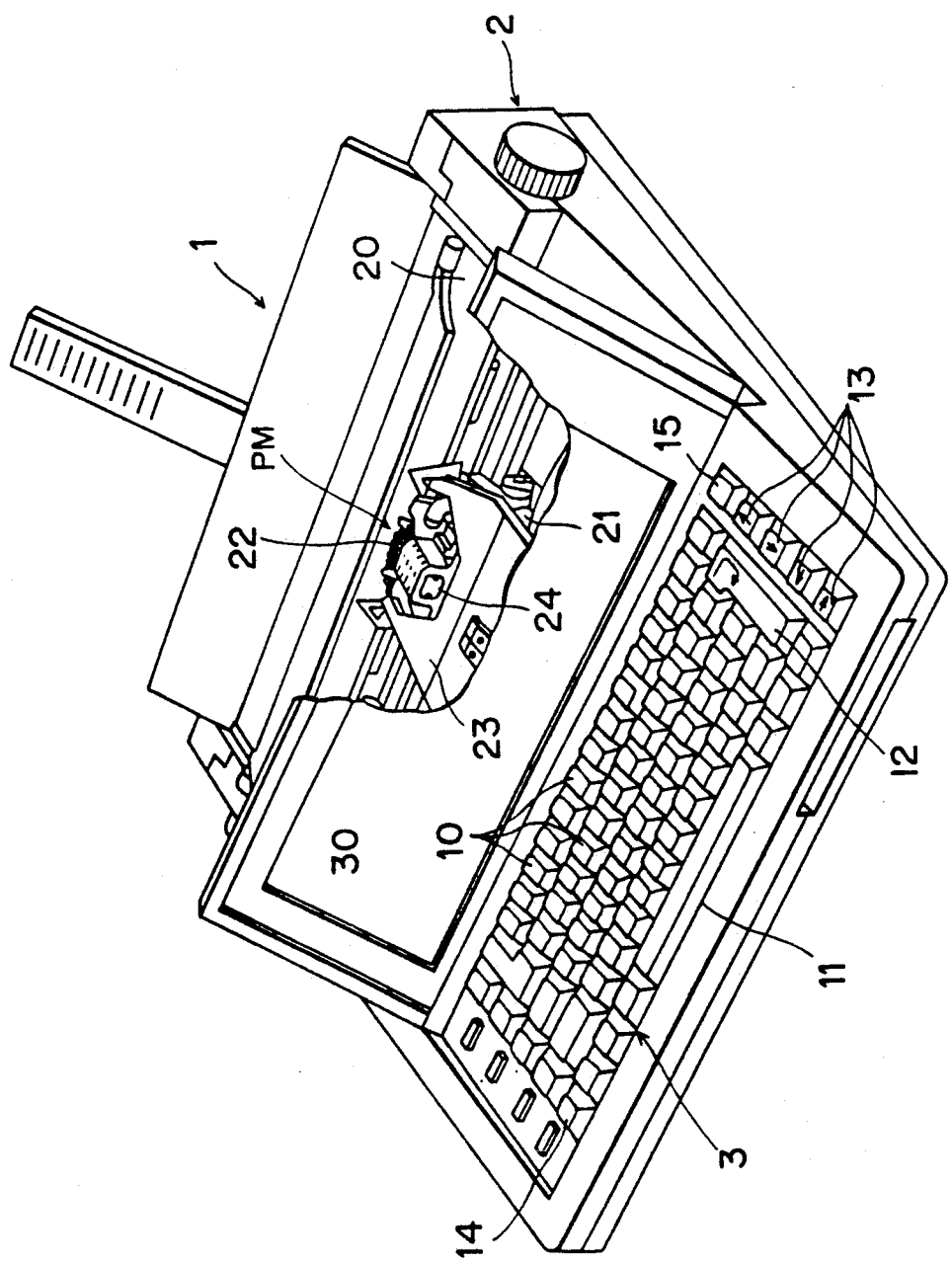
FIG. 2 is a perspective view of a word processor using the layout display control system as shown in FIG. 1.

FIG. 2 shows an English word processor to which the present invention is applied.

As shown in FIG. 2, the word processor 1 has a housing frame 2 supporting a keyboard 3 on a front portion thereof and housing a type-wheel printing mechanism PM behind the keyboard 3. The word processor 1 includes a liquid crystal display 30 capable of displaying 14 lines of characters and symbols. The liquid crystal display 30 is positioned behind the keyboard 3 and angularly movable between an operative position shown in FIG. 2 and a storage position.

Figure 8A:
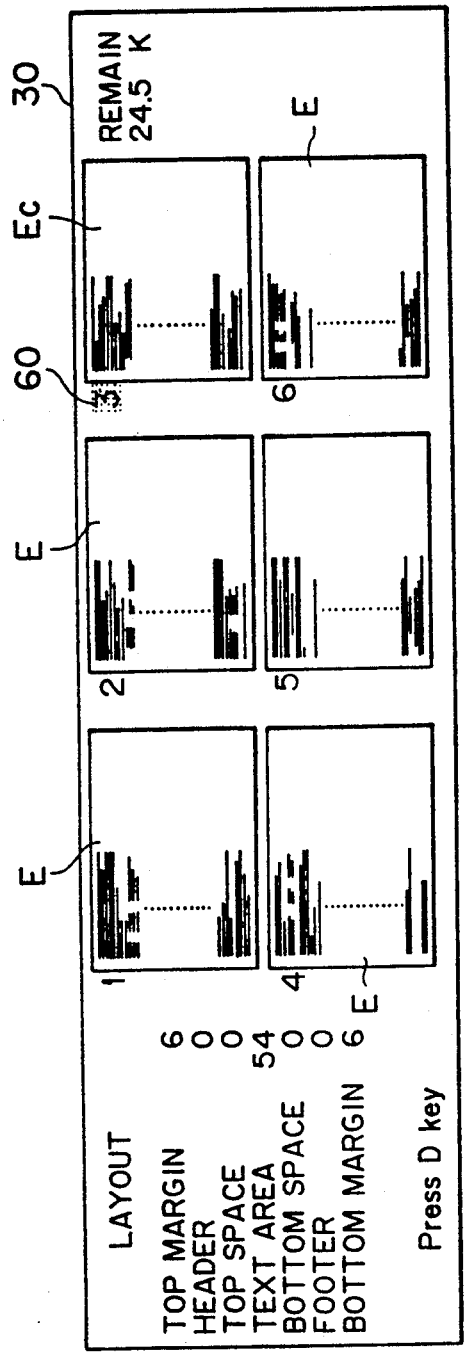
FIGS. 8(A) through 8(C) are diagrams showing displayed layouts in the single and expanded page layout display modes.
Figure 8B:
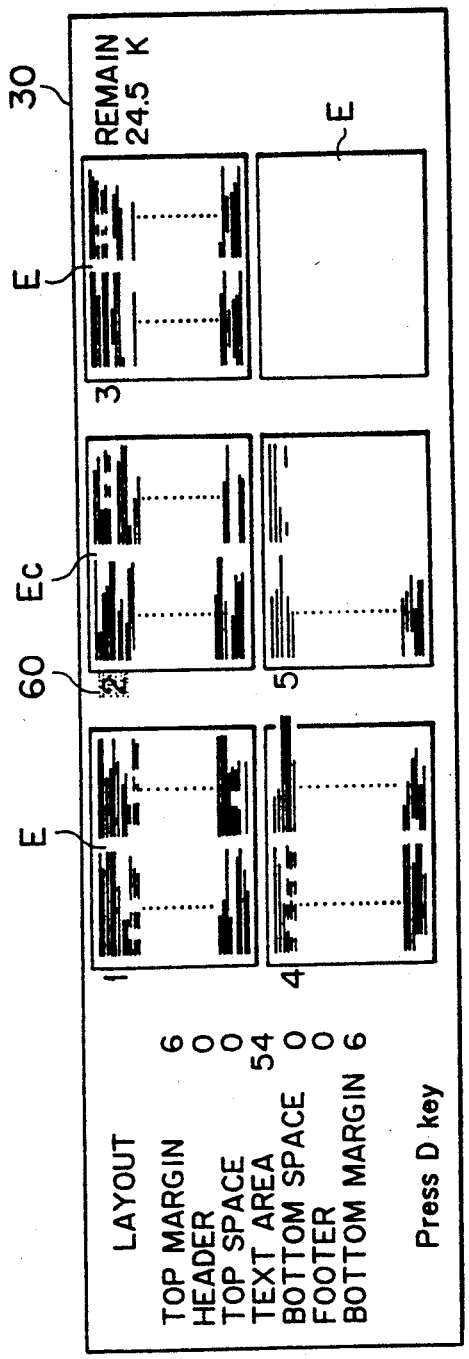
Figure 8C:
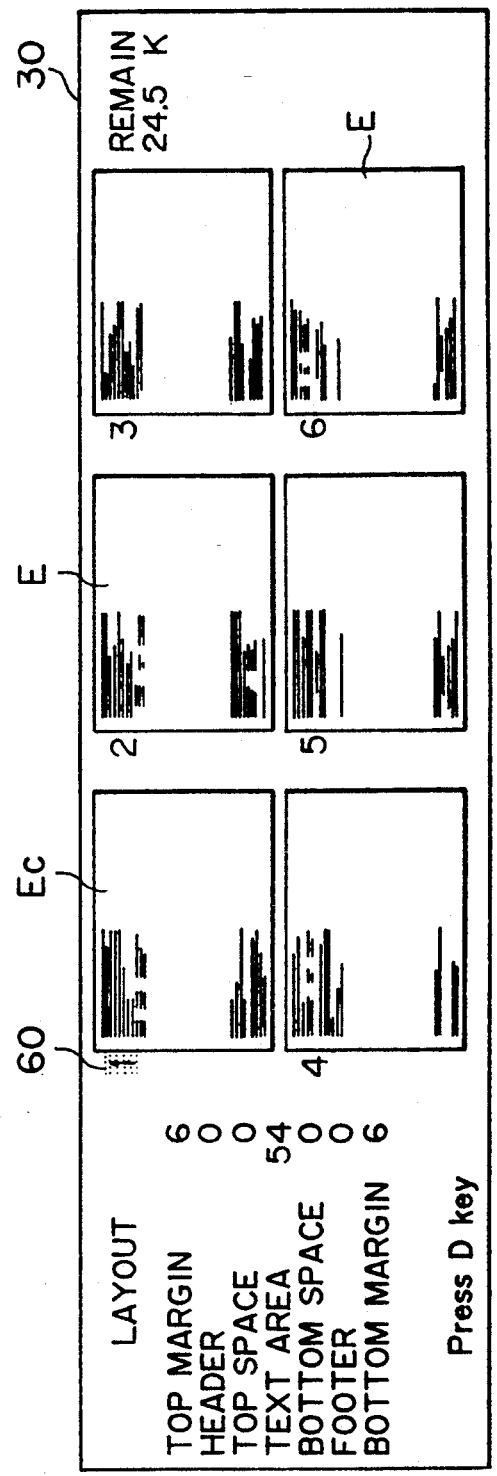

The keyboard 3 comprises character keys 10 including alphabetical keys, numeral keys, and symbol keys, a space key 11, a return key 12, cursor moving keys 13 for vertically and horizontally moving a cursor 60 (FIGS. 8(a) through 8(c)) on the display 30, a layout key 14 for selecting a layout display mode to display the layout of document data, a cancel key 15 for canceling the execution of various functions, and various function keys.

The printing mechanism PM is of a general construction composed of a platen 20 for feeding a sheet of print paper, a carriage 21 movable laterally along the platen 20, a daisy type-wheel 22 having a plurality of type characters on the tip ends of radial spokes, a ribbon cassette 23 for storing an ink ribbon, and a hammer solenoid 24 for hitting the type characters of the daisy type-wheel 22.

Figure 3:
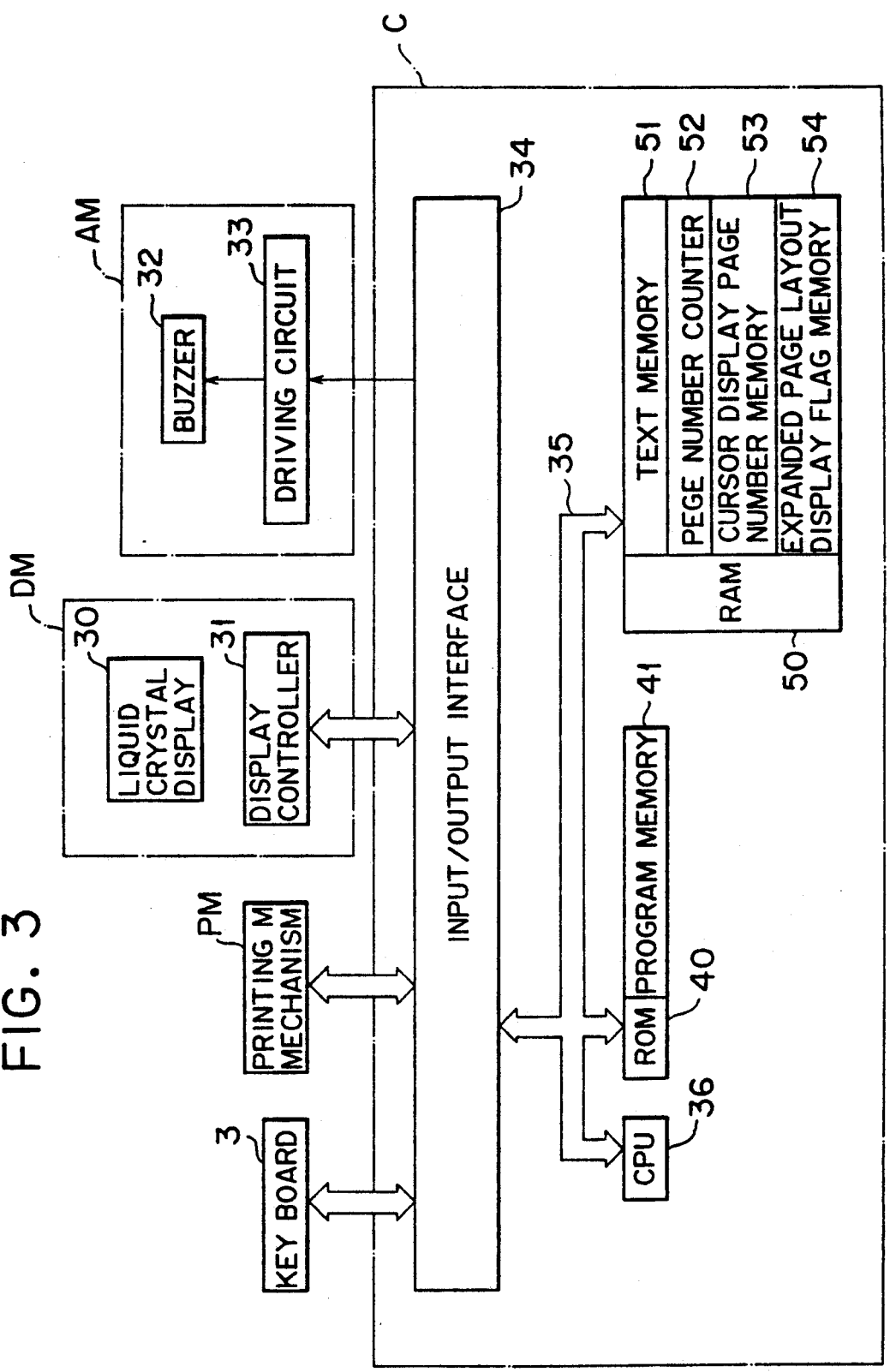
FIG. 3 is a block diagram of a control system of the word processor.

FIG. 3 is a block diagram of a control system for the word processor 1.

The word processor 1 basically comprises the keyboard 3, the printing mechanism PM, a display mechanism DM, an alarm mechanism AM, and a controller C. The keyboard 3, the printing mechanism PM, the display mechanism DM, and the alarm mechanism AM are electrically connected to an input/output interface 34 of the controller C.

The display mechanism DM has a general structure including the liquid crystal display 30, and a display controller 31 including a display RAM for outputting display data and a character generator ROM which stores many dot patterns for characters and symbols. The alarm mechanism AM comprises a buzzer 32 and a driver circuit 33 for energizing the buzzer 32.

The controller C comprises a CPU 36, the input/output interface 34 connected to the CPU 36 through a bus 35 such as a data bus, a ROM 40, and a RAM 50.

The ROM 40 includes a program memory 41 which stores a control program for controlling the printing mechanism PM and the display mechanism DM according to code data received from the keyboard 3, and a control program for displaying a layout when the layout display mode is selected. The control program for displaying a layout includes a subroutine for controlling the display of the layout of a single page and a subroutine for controlling the display of the layout of an expanded page. The control program for displaying a layout also includes an equation for determining a first display page number S:

$$S = [\text{an integer of } \{(I-1)/12\} \times 12 + 1 \tag{1}$$

where I is a page number count, an equation for determining a cursor display page number Md to newly display the cursor 60: Md=(an odd display page number M+1)/2 ... (2), an equation: Md=(an even display page number M)/2 ... (3), and an equation for determining a first display page number S: S=[the integer of ](I−1)/6}×6+1 ... (4). Each of the subroutine for controlling the display of the layout of a single page and the subroutine for controlling the display of the layout of an expanded page includes a conversion control subroutine for converting the arrangement of characters of read document data into the arrangement of dots.

The RAM 50 includes a text memory 51 for storing document data of a plurality of documents which are inputted, a page number counter (whose count is I) 52 for storing the page number of a current page in which the cursor 60 is positioned, among the document data displayed on the display 30, a cursor display page number memory 53 for storing the number M of a cursor display page in which the cursor 60 is displayed, among the display page numbers allotted to layout display areas E where the layouts of the pages are displayed, an expanded page layout display flag memory 54 for storing an expanded page layout display flag F which is set when an expanded page layout display mode is selected by pushing the letter key 10 bearing "D", and is reset when a single page layout display mode is selected, and various memories for temporarily storing the results of arithmetic operations carried out by the CPU 36.

Figure 4:
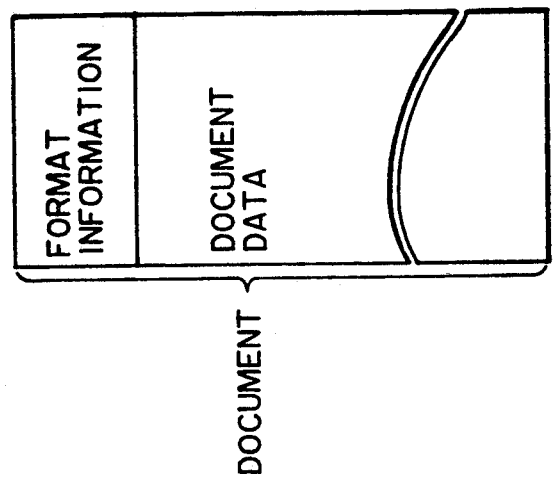
FIG. 4 is a diagram illustrative of the structure of a document stored in a text memory.

As shown in FIG. 4, each of the documents stored in the text memory 51 includes format information, in its leading portion, relative to a printing format that is inputted when document data are generated, and document data including margin codes established by left and right margin setting keys and positional data with respect to the positions where the margin codes are set.

The format information contains printing format information used when the document data are to be printed, the printing format information representing the number of lines along which one page of document data is printed.

Figure 5B:
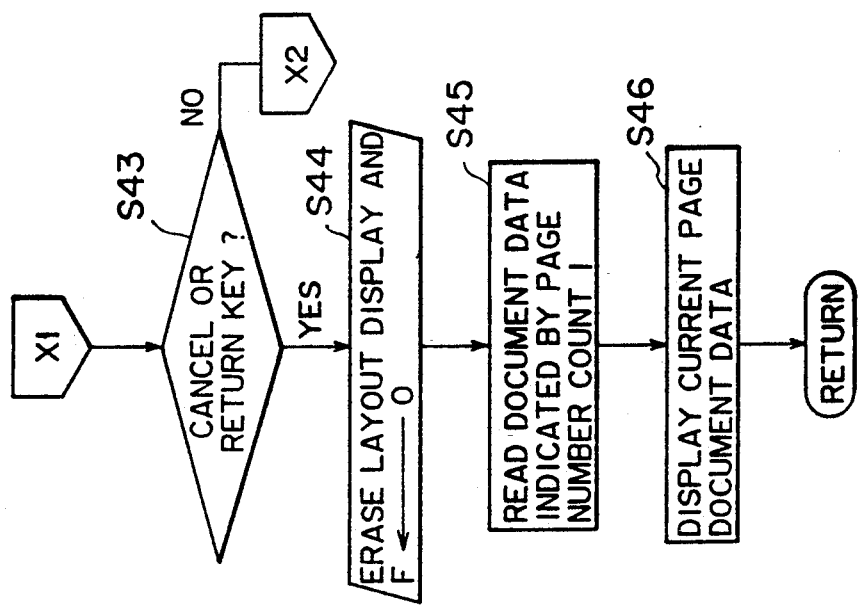

A routine for controlling the display of a layout, which is executed by the controller C of the word processor 1, will be described below with reference to the flowchart shown in FIGS. 5(a) and 5(b).

The flowchart includes steps denoted by Si (i = 10, 11, 12, . . .). Before the layout display control routine is executed, either desired document data stored in the text memory 51 are displayed on the display 30, or newly inputted document data are displayed on the display 30. The page number of a current page in which the cursor 60 is displayed is successively updated as the cursor is moved according to a cursor control program (not shown), and stored in the page number counter 52.

Figure 6:
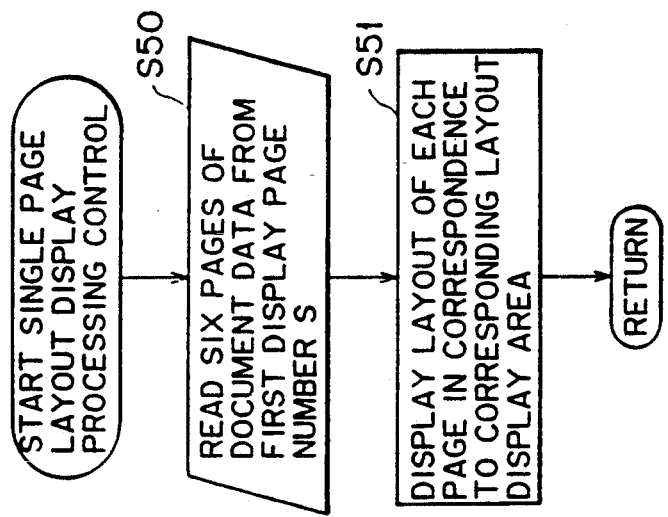
FIG. 6 is a flowchart of a single page layout display control subroutine.

When the layout display control routine is started in response to depression of the layout key 14, the single page layout display mode is enabled and the expanded page layout display flag F is reset in a step S10. Then, the display 30 displays six rectangular layout display areas E each having a horizontal length of 8.5 inches (85 letters/pica pitch) and a vertical length corresponding to the preset number of lines based on format information, in a step S11. Based on the page number count I, a first display page number S is calculated according to the equation (4), and layout display area numbers beginning with the calculated first display page number S are displayed respectively in the six layout display areas E, in a step S12. The page number count I is stored as M in the cursor display page number memory 53, and the cursor 60 is displayed over the cursor display page number M in a step S13. Then, the subroutine for controlling the display of the layout of a single page is executed in a step S14, as shown in FIG. 6.

When the single page layout display control subroutine is started, six pages of document data, beginning with the first display page number S, are read on the basis of the data on the number of lines to be printable every one page which is contained in the format information, and also the line changing data contained in the document data, in a step S50. The layouts of the six pages, which contain the line arrangement of dots converted respectively from the character arrangement in the read six pages of document data, are displayed in the respective layout display areas E in a step S51. After the single page layout display control subroutine, the format information contained in the leading portion of the document data and the storage capacity of an empty area of the RAM 50 are displayed in a step S15. For example, if the layout key 14 is pushed when there are 10 pages of document data that are selected for layout display and the cursor 60 is positioned in the third page (current page) disposed on the display 30, then six pages of document data, ranging from the first page to the sixth page and including the current page indicated by the page number "3" stored in the page number counter 52, are displayed respectively in the six layout display areas E, with the cursor 60 being displayed over the layout display area number "3". In order to distinguish the layout display area Ec corresponding to the page number of the current page from the other layout display areas E, the layout display area number "3" of the layout display area Ec is displayed in reverse video.

The display 30 also displays, in its lefthand end area, format information including such items as "TOP MARGIN 6", "HEADER 0" for indicating whether there is a title to be printed on the first line in each page, "TOP SPACE 0" for indicating the distance between "HEADER" and "TEXT AREA", "TEXT AREA 54", "BOTTOM SPACE 0", "FOOTER 0", and "BOTTOM MARGIN 6".

Figure 7:
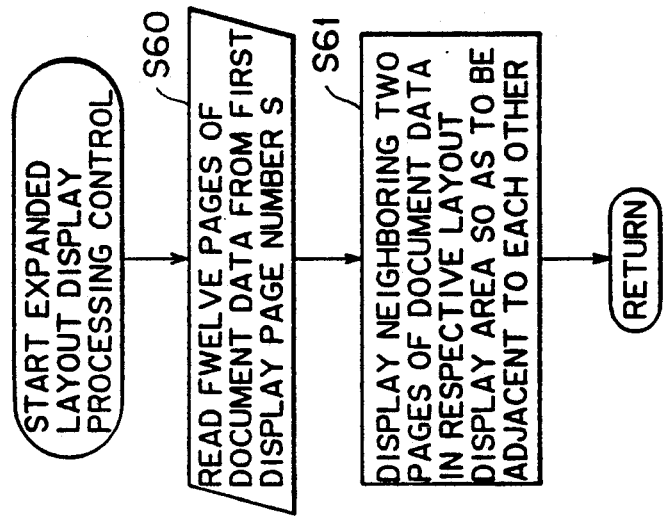
FIG. 7 is a flowchart of an expanded page layout display control subroutine.

If the letter key 10 bearing "D" is pressed to select the expanded page layout display mode in steps S16 and S17 (Yes), then on the condition that the single page layout display mode is selected in a step S18 (No), the first display page number S is calculated according to the equation (1), and the cursor display page number Md is calculated according to the equation (2) or (3) and stored as M in the cursor display page number memory 53 in a step S19. Based on the result of the calculation: (S+1)/2 using the first display page number S, the six layout display area numbers are displayed, and the cursor 60 is displayed over the cursor display page number M in a step S20. Then, the expanded page layout display control subroutine is executed in a step S21, as shown in FIG. 7.

When the expanded page layout display control routine is started, twelve pages of document data beginning with the first display page number S and containing the current page are read in a step S60. The layouts of two pages of documents, which comprise adjacent odd- and even-numbered pages, among the read twelve pages, are displayed, side by side, in each of the layout display areas E, Ec in a step S61, the layouts being successively displayed in order from smaller page numbers in the layout display areas E, Ec. After the expanded page layout display control routine, the expanded page layout display flag F is set in a step S22, and control returns to the step S16. The two layouts displayed in each of the layout display areas E, Ec are spaced from each other by an interval corresponding to the number of letters which is established in advance in the printing format, for example. If a line or lines in an even-numbered page in the righthand half portion of a layout display area E extend five letters or more to the right beyond the right margin of a sheet of print paper (e.g., of a letter size), then the extended part of the line or lines is displayed as four dots to the right of the layout display area E. For example, when the letter key "D" is pushed while the cursor 60 is being displayed over the layout display area number "3", as shown in FIG. 8(a), the layouts of the first and second pages are displayed, side by side, in the layout display area E indicated by the layout display area number "1", as shown in FIG. 8(b). Likewise, the layouts of the third and fourth pages are displayed, side by side, in the layout display area Ec indicated by the layout display area number "2". Likewise, the layouts of successive two pages are displayed in each of the layout display areas up to the layout display area number "5". Since the page number of the current page is "3", the cursor 60 is displayed over the layout display area number "2". In the layout display area E indicated by the layout display area number "4", the part of lines which extend five letters or more to the right beyond the right margin of the sheet of print paper, in the eighth page of document data, is displayed as four dots outside of the layout display area E.

When the letter key 10 bearing "D" is pressed again in order to select the single page layout display mode while in the expanded page layout display mode in the steps S16, S17, S18 (Yes), then the expanded page layout display flag F is reset in a step S23. Then, the first display page number S is calculated according to the equation (4), and the count I of the page number counter 52 is stored as M in the cursor display page number memory 53 in a step S24. The six layout display area numbers beginning with the first display page number S are displayed, and the cursor 60 is displayed over the cursor display page number M in a step S25. Then, the single page layout display control subroutine is executed in a step S26. For example, when the letter key "D" is pushed again while the layouts of document data are being displayed in the expanded page layout display mode as shown in FIG. 8(b), the layouts of the first through sixth pages of document data are displayed in the single page layout display mode as shown in FIG. 8(a).

If the key 13 for moving the cursor to the right is pressed while the layouts of document data are being displayed in the single page layout display mode or the expanded page layout display mode in the step S16 (Yes) and a step S27 (Yes), the cursor display page number M is incremented by 1 in a step S28. If in the single page layout display mode in a step S29 (No), then the count I is incremented by 1 in a step S30, and the cursor 60 is displayed over the cursor display page number M in a step S31, after which control goes back to the step S16. If the count I is an odd number in the expanded page layout display mode in the step S29 (Yes) and a step S32 (Yes), then the count I is incremented by 2 in a step S33. If the count I is an even number in the expanded page layout display mode in the steps S29, S32 (Yes), then the count I is incremented by 1 in the step 30, and control goes through the step S31 back to the step S16.

If the key 13 for moving the cursor to the left is pressed in the step S16 (Yes) and a step S34 (Yes), then the cursor display page number M is decremented by 1 in a step S35. If the cursor display page number M is not "0" in a step S36 (No) and if in the single page layout display mode in a step S37 (No), then the count I is decremented by 1 in a step S38, and control goes through the step S31 back to the step S16. If the count I is an odd number in the expanded page layout display mode in the step S37 (Yes) and a step S39 (Yes), then the count I is decremented by 2 in a step S40. If the count I is an even number in the expanded page layout display mode in the step S37 (Yes) and the step S39 (No), then the count I is decremented by 3 in the step 41, and control goes through the step S31 back to the step S16. For example, when the key 13 for moving the cursor to the left is pressed twice while the page number of the current page is "3" and the cursor 60 is being displayed over the layout display area number "3", as shown FIG. 8(a), the page number of the current page is changed to "1" and the cursor 60 is displayed over the layout display area number "1" in order to distinguish the layout display area Ec that is represented by the page number "1", as shown in FIG. 8(c).

If the cancel key 15 or the return key 12 is pressed while in the single page layout display mode or in the expanded page layout display mode in the step S16 (Yes) and a step S43 (Yes), the display of all the layouts is canceled, and the expanded page layout display flag F is reset in a step S44. Then, the current page of document data indicated by the page number count I is read from the text memory 51 in a step S45. The current page of document data is displayed on the display 30 in a step S46, after which control returns to a main routine. If any of the other keys than the letter key 10 bearing "D", the keys 13 for moving the cursor to the right and the left, the cancel key 15, and the return key 12 is pressed in the step S43 (No), or if the cursor display page number M is "0" in the step S36 (Yes), then the buzzer 32 is energized in a step S42, from which control returns to the step S16.

When the key 13 for moving the cursor downwardly or the key 13 for moving the cursor upwardly is pressed, the display 30 may display the layouts of pages associated with those layout display area numbers which are equal to the sums of, or the differences between, the presently displayed layout display area numbers and "3".

When the cancel key 15 is pressed while the layouts of document data are being displayed in the layout display areas E, Ec, the page whose layout display is canceled may be regarded as the current page, and the document data of the current page may be displayed on the display 30.

The number of layout display areas E which can be displayed is not limited to six but may be at least two.

As described above, in the layout display mode, the page number indicating the current page can be changed into a new page number, and an identification is displayed to distinguish the layout display area Ec corresponding to the new page number from the other layout display areas E. Based on the displayed identification, the operator can easily change the current page number accurately as desired.

Upon cancellation of the layout display mode, the current page of document data which is indicated by the newly established current page number is automatically displayed on the display 30. Therefore, the operator is not required to operate on the layout display control system in order to display the desired page of document data.

Various symbols or marks may be displayed to distinguish the layout display area Ec corresponding to the current page number.

The ROM 40 may store a display page group table containing groups of the page numbers of six pages to be displayed together in the single page layout display mode, and the first display page numbers of the respective groups. When the single page layout display mode is selected, the first display page number S may be determined from the display page group table based on the page number count I.

The principles of the present invention are also applicable to various document processing apparatus capable of displaying layouts, such as an European-language or Japanese word processor having a floppy disk drive for storing document data in a floppy disk.

Since the layout display control system for a document processing apparatus according to the present invention has the current page identification display control means, the current page changing means, and the document data display control means, as described above, a current page number indicating a current page can be changed into a new current page number in the layout display mode, and an identification which distinguishes the layout display area corresponding to the new current page number can be displayed. The displayed identification allows the operator to recognize the current page number with accuracy.

When the layout display mode is canceled, the current page of document data which is indicated by the new current page number is automatically displayed on the display. Therefore, the operator is not required to operate on the layout display control system in order to display the desired page of document data.

What is claimed is:

1. A document processing apparatus; comprising:
   input means for inputting document data of plural pages of documents and various command data including printing format information;
   document data memory means for storing the inputted document data and the printing format information;
   display means for selectively displaying the document data and a plurality of layout display areas;
   current page memory means for storing a current page number indicating a current page of document data being currently displayed on said display means;
   layout display mode selecting means for selecting a layout display mode to display layout data representing the layouts of a predetermined number of pages of document data in a selected layout mode on said display means;
   layout display control means for reading the predetermined number of pages of document data, including the current page of document data indicated by the current page number stored in said current page memory means, from said document data memory means, converting the read pages of document data into layout data representing layouts which illustrate actual relative locations of each element of document data on each of the plurality of pages, and displaying the layouts of the pages of document data in respective layout display areas in a layout display mode;
   current page identification display control means for displaying an identifying means for distinguishing the layout display area corresponding to the current page number stored in said current page memory means from the other layout display areas in the layout display mode;
   current page changing means for changing the current page number stored in said current page memory means into a new current page number in the layout display mode; and
   document data display control means for displaying, on said display means, the page of document data which is indicated by a new current page number stored in said current page memory means when a layout display mode is canceled.

2. A document processing apparatus as claimed in claim 1, wherein said display means comprises a liquid crystal display.

3. A document processing apparatus as claimed in claim 1, wherein said current page identification display control means includes reverse video display means for displaying on said display means the current page number in reverse video with a cursor being displayed over the current page number.

4. A document processing apparatus as claimed in claim 1, wherein the predetermined number of pages is 6 or 12.

5. A document processing apparatus as claimed in claim 1, wherein said layout display control means comprises converting means for converting an arrangement of characters of the document data into an arrangement of dots or lines.

* * * * *